Patented Jan. 10, 1933

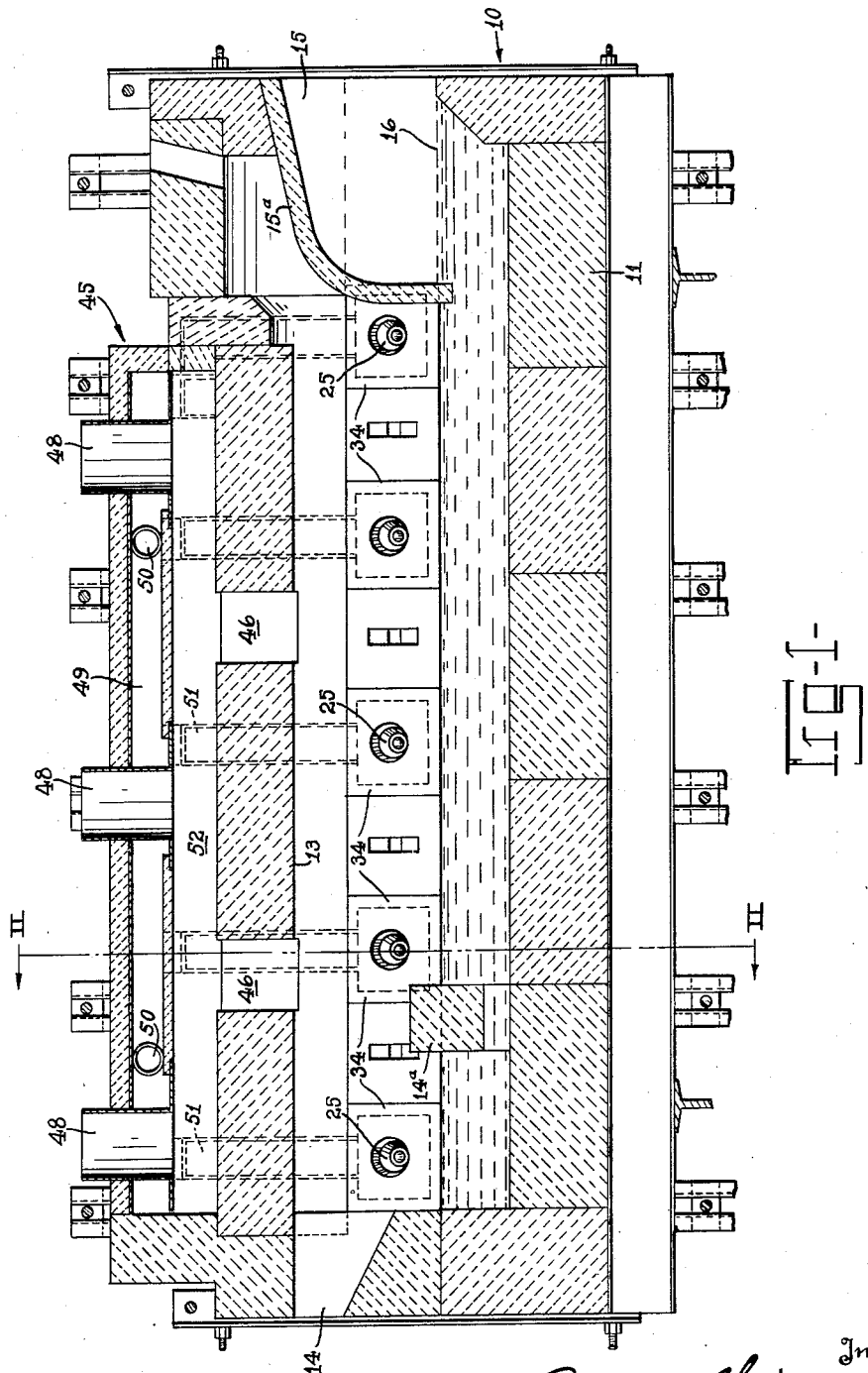

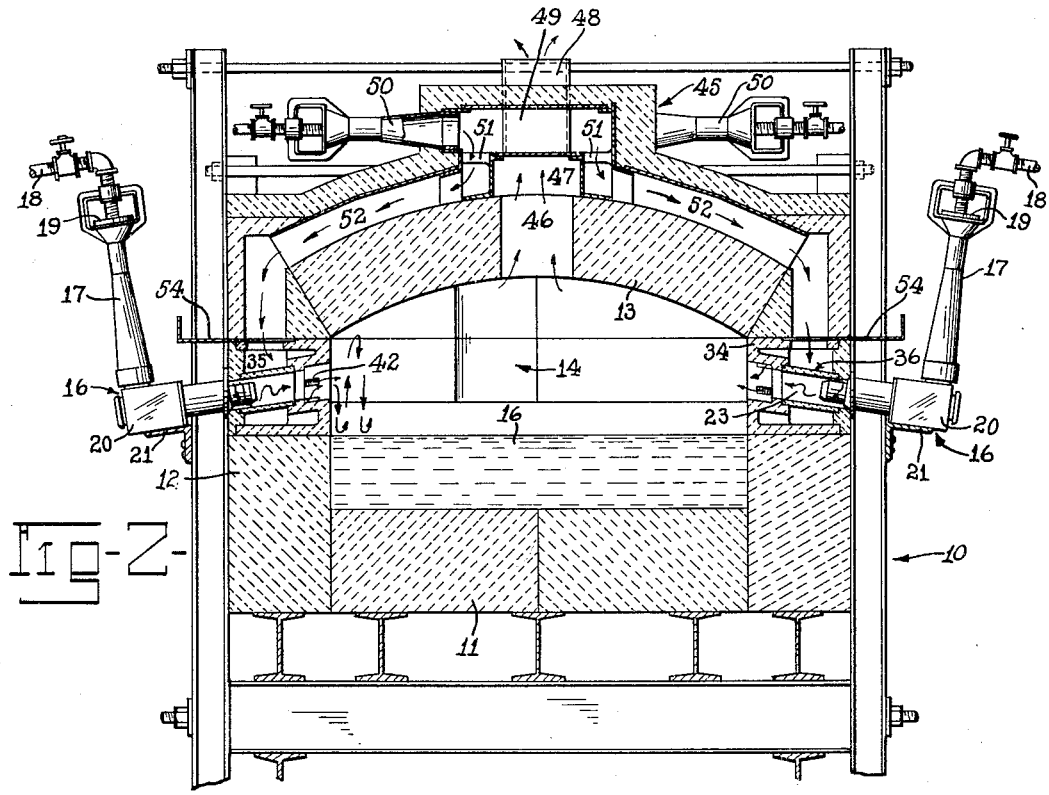
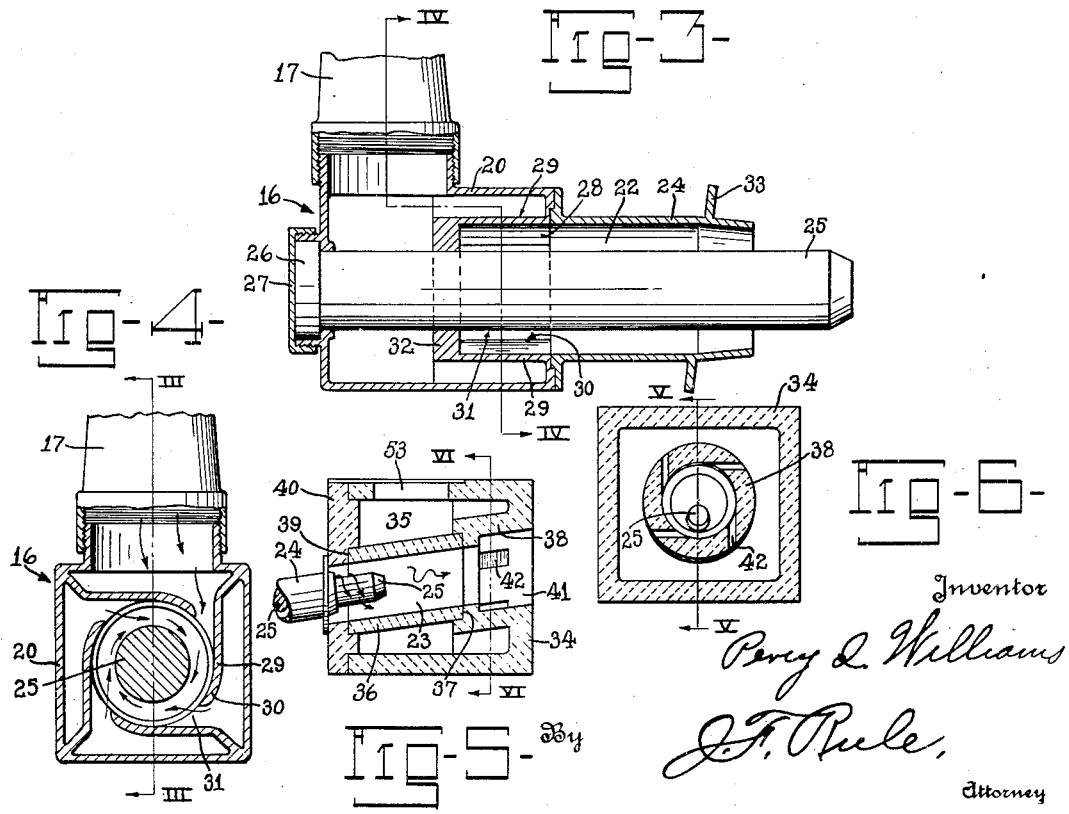

1,894,249

UNITED STATES PATENT OFFICE

PERCY Q. WILLIAMS, OF TOLEDO, OHIO, ASSIGNOR TO OWENS-ILLINOIS GLASS COMPANY, OF TOLEDO, OHIO, A CORPORATION OF OHIO

HEATING APPARATUS FOR GLASS FURNACES

Application filed December 11, 1929. Serial No. 413,409.

The present invention relates to improvements in heating apparatus for glass furnaces and has for an object the provision of means whereby uniform temperature conditions may be maintained throughout the interior of a furnace or tank and material contained therein.

Ordinarily heating apparatus for tanks or furnaces of the type herein illustrated fails to uniformly heat the molten material because of the particular arrangement and construction of the injectors or burners. Injectors of conventional type, arranged in accordance with common practice, do not apply the same quantities of heat to the material about the margin of the tank as are applied to other areas because the injected flames are for the greater part directed along upwardly inclined paths and in straight lines from the injectors. Thus the marginal areas of the glass or other material being heated are cooler than the remaining areas and as a result mold charges obtained from the supply body lack the conditioning which is essential to the production of quality glassware.

An object of this invention is the provision of a novel type of burner whereby the above objections may be overcome. To this end, the burner is of a form to impart to the products of combustion entering the furnace a whirling motion about a substantially horizontal axis so that immediately upon entering the furnace, the heat moves in both vertical and horizontal paths and completely covers the entire surface of the glass.

Other objects will be apparent hereinafter.

In the drawings—

Fig. 1 is the vertical longitudinal sectional view of the tank, showing a plurality of burners and their connection to a regenerative furnace, from which heated air is obtained.

Fig. 2 is a transverse sectional view taken substantially along the line II—II of Fig. 1.

Fig. 3 is a detail sectional view of one of the burners taken along the line III—III of Fig. 4.

Fig. 4 is a transverse sectional view taken substantially along the line IV—IV of Fig. 3.

Fig. 5 is a sectional view taken substantially along the line V—V of Fig. 6 and shows the ports through which preheated air enters the burner for mixture with the previously mixed air and gas.

Fig. 6 is a sectional view taken substantially along the line VI—VI of Fig. 5.

The furnace or tank 10, embodying the present invention, includes a floor 11, side walls 12, and a roof or cover 13, all of which are held in assembly by suitable framework as shown in Fig. 2. At one end of the tank, an opening 14 is provided through which molten glass or batch may be delivered into the tank. An opening 15 at the other end of the tank and a jack-arch 15ª provide an exposed gathering area of glass from which mold charges may be obtained by any suitable gathering device. A bridgewall 14ª or skimmer is arranged near the opening 14 for a well known purpose.

Uniform temperature and viscosity throughout the supply body of molten glass is obtained and maintained, according to the present invention, by introducing heat into the tank 10 or furnace in a manner to insure filling of the entire space above the glass with heat of uniform temperature throughout. Thus, the glass in the marginal areas of the supply body is heated to the same degree as the remaining glass, with the result that cold streaks in the gathered glass are avoided. The above conditions are obtained by arranging a plurality of burners 16 or injectors along opposite sides of the furnace, each injector operable to direct a fuel mixture through an opening in one of the walls.

Each burner 16 or injector includes a Venturi tube 17 into the upper end of which variable proportions of fuel gas and air are introduced. A gas supply pipe 18 (Fig. 2) is suitably connected to the upper end of the Venturi tube and supports a valve disk 19 which is adjustable for the purpose of regulating the supply of air to the tube. This tube may be of ordinary construction. A mixing chamber 20 supported on a bracket 21 is suitably connected to the lower end of the Venturi tube 17.

Air and fuel gas entering the mixing chamber 20 are thoroughly mixed and then ejected from the chamber for passage into the tank or furnace 10. This mixture is given a whirling motion about a substantially horizontal axis as it leaves the mixing chamber so that immediately upon entry into the tank, the heat moves vertically upward and downward and impinges upon the adjacent side walls and completely covers the surface of the supply body of molten glass as pointed out above. The fuel mixture as it leaves the mixing chamber 20 enters an elongated annular chamber 22 communicating at one end with the interior of the mixing chamber 20 and opening at its other end into a passageway 23 leading into the tank or furnace. This annular chamber 22 is formed by a tubular extension 24 and a core 25, the latter extending through the tubular extension and mixing chamber and beyond the ends of the tubular extension 24 and mixing chamber, one end of the core having a circular head 26 thereon over which a retaining cap 27 is fitted to secure the core 25 in its proper position. An outlet opening 28 is formed in one wall of the mixing chamber 20 and registers with the inner end of the tubular extension 24.

Rotary or whirling motion is imparted to the fuel mixture just prior to movement through the opening 28 into the annular chamber 22 by means of an annular series of vanes 29 (Figs. 3 and 4). The end portions 30 of the vanes are curved about the axis of the core 25 and are spaced from the body portions of the adjacent vanes to provide an annular series of slots 31 through which the mixed air and gas are forced from the mixing chamber to the outlet 28 and thence into the annular chamber 22. A collar 32 connects the inner ends of the vanes 29 and provides part of the supporting means for the core 25. A circular flange 33 is provided near the inner end of the tubular extension 24 to form an effective seal between said extension and the exterior wall surface in proximity to the passageway 23 through the tank wall.

According to the present invention, it is intended that the quantity of air introduced into the Venturi tube 17 be less than that necessary to obtain combustion so that the mixture will not ignite until it has just about reached the interior of the tank and been supplied with additional air. The construction through which this is accomplished includes a burner block 34 (Figs. 2, 5 and 6) having a chamber 35 into which preheated air is introduced prior to injection into the fuel mixture passing through the opening 23. This block 34 is formed with a passageway 23 or opening therethrough for the purpose of conducting the fuel mixture to the interior of the tank or furnace. This opening or passageway 23 is formed by a tube 36, one end of which seats in an annular recess 37 in the inner end of a sleeve 38 in said block, while the other end of said tube fits into an annular recess 39 in a plate 40 or block which closes the outer end of the chamber 35. In order that combustion may be retarded to the greatest extent possible, additional air is introduced into the fuel mixture approximately at the point of entry of the fuel mixture into the tank or furnace. For this purpose, the sleeve 38 (Figs. 5 and 6), which is aligned with an outlet opening 41 in the inner end of the burner block 34, is formed with an annular series of tangentially disposed slots 42 which provide communication between the interior of the sleeve and the chamber 35. Thus, the additional air, which is preferably preheated, is forced through the slots 42 and commingles with the fuel mixture introduced into the opening 23 by the burner 16. Due to the arrangement of the slots 42, the additional air entering the sleeve 38 is moving in a circular path about the axis of the opening 23 in the same direction as the fuel mixture entering said opening 23 from the injector 16 or burner, with the result that the combustible mixture at the point of ignition is given a positive whirling motion and impinges upon all areas of the supply body of glass.

Preheating of the additional air introduced into the fuel mixture is obtained by providing a heater 45 or regenerative furnace over the tank 10 so that the waste gases exhausted from the tank or furnace are utilized to heat air which is then forced into the chambers 35 of the burner blocks 34. The cover 13 of the tank is provided with a plurality of exhaust ports 46 leading to a manifold 47 which in turn communicates with a series of exhaust stacks 48 through which waste gases of combustion pass to the atmosphere. A chamber 49 extends lengthwise of the manifold 47 enclosing portions of the stacks 48 and communicating with a number of Venturi tubes 50 through which compressed air enters said chamber. A plurality of exhaust ports 51 arranged along the lower side of the chamber 49 communicate with conduits 52 which lead to inlet openings 53 in the upper sides of the blocks 34 (Figs. 2 and 5). Compressed air is introduced into the chamber 49 and thoroughly heated prior to being exhausted through the conduits 52 to the chamber 35 from which the air passes into the passageway 23 by way of the slots 42. Slide valves 54 individual to the burners and arranged over the inlet openings 53, are adjustable to regulate the volume of preheated air introduced into the fuel mixture passing into the furnace.

Modifications may be resorted to within the spirit and scope of the appended claims.

What I claim:

1. In combination, a furnace wall including a burner block extending therethrough, said block being of hollow construction and having one open end, a closure plate for the open end of said burner block, said plate and block having a pair of aligned openings therein, a wall surrounding the opening in the burner block and extending into the latter, a tube positioned to form with said wall a passageway connecting said openings, and means for directing a fuel mixture lengthwise through said openings and passageway.

2. In combination, a furnace wall including a burner block extending therethrough, said block being of hollow construction and having one open end, a closure plate for the open end of said burner block, said plate and block having a pair of aligned openings therein, a wall surrounding the opening in the burner block and extending into the latter a tube positioned to form with said wall a passageway connecting said openings, means for directing a fuel mixture lengthwise through said openings and passageway, and means including ports communicating with the interior of said passageway for supplying air to the latter.

3. In combination, a furnace wall including a burner block extending therethrough, said block being of hollow construction and having one open end, a closure plate for the open end of said burner block, said plate and block having a pair of aligned openings therein, a wall surrounding the opening in the burner block and extending into the latter, a tube positioned to form with said wall a passageway connecting said openings, means for directing a fuel mixture lengthwise through said openings and passageway, and a series of ports formed in said wall, said ports providing communication between the passageway and interior of the burner block and arranged to impart a whirling motion to air flowing through the ports into the passageway.

4. In combination, a furnace wall including a burner block extending therethrough, said block being of hollow construction and having one open end, a closure plate for the open end of said burner block, said plate and block having a pair of aligned openings therein, a tube within the block connecting said openings and forming therewith a passageway through the block, an injector arranged to direct a fuel mixture lengthwise through said passageway, and means including ports opening into the passageway between the inner end of the injector and the inner end of said block for supplying air pressure to said passageway.

5. In combination, a furnace wall including a burner block extending therethrough, said block being of hollow construction and having one open end, a closure plate for the open end of said burner block, said plate and block having a pair of aligned openings therein, a tube within the block connecting said openings and forming therewith a passageway through the block, an injector arranged to direct a fuel mixture lengthwise through said passageway, and means including ports opening into the passageway between the inner end of the injector and the inner end of said block for supplying air pressure to said passageway, said ports arranged to impart a whirling motion to the air entering the passageway.

6. In combination, a furnace wall including a burner block extending therethrough, said block being of hollow construction and having one open end, a closure plate for the open end of said burner block, said plate and block having a pair of aligned openings therein, a tube within the block connecting said openings and forming therewith a passageway through the block, an injector arranged to direct a fuel mixture lengthwise through said passageway, means including ports opening into the passageway between the inner end of the injector and the inner end of said block for supplying air pressure to said passageway, and means for imparting a whirling motion to the fuel mixture prior to its entry into the passageway.

Signed at Toledo, Ohio, this 10 day of December, 1929.

PERCY Q. WILLIAMS.